April 18, 1933.                M. E. HILL                1,904,048
                               BELT FITTER
                          Filed Aug. 26, 1930
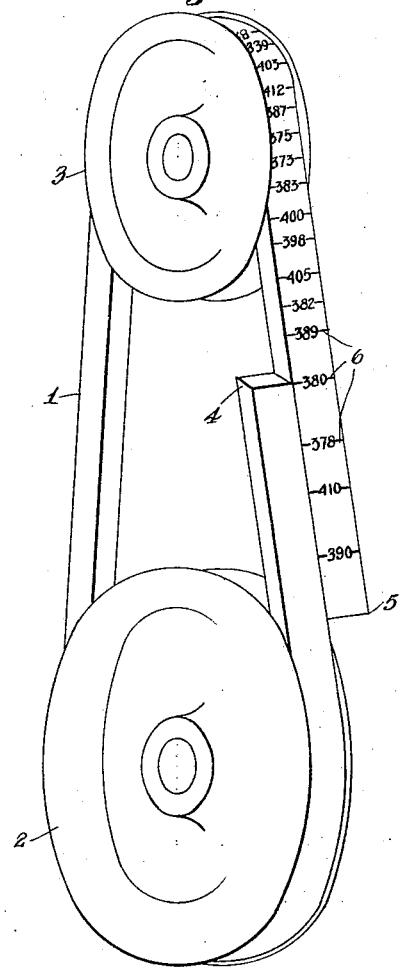
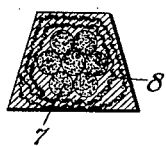 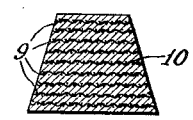

Patented Apr. 18, 1933

1,904,048

UNITED STATES PATENT OFFICE

MATTHEW E. HILL, OF ATLANTA, GEORGIA, ASSIGNOR TO THE HOLFAST RUBBER COMPANY, OF ATLANTA, GEORGIA, A CORPORATION OF GEORGIA

BELT FITTER

Application filed August 26, 1930. Serial No. 477,865.

This invention relates to means for quickly and readily ascertaining the size of a belt necessary to be used for transmitting power from a driving pulley to a driven pulley. More particularly, it relates to a device which is capable of quickly and easily determining the dimension of an endless belt required to operate the fan employed in connection with an automobile engine.

Automobile engines are today provided with fans driven by an endless belt trained over a pulley cooperatively mounted or connected to said fan and another pulley to which motion is imparted by the engine in any suitable and well known manner. The pulleys are usually provided with V-shaped grooves of greater depth than the thickness of the belt, in order to give the necessary clearance at the bottom and top, and the belt is usually made of a corresponding cross-section. In actual use the inclined sides of the belt frictionally engage the inclined sides of the groove and transmit the motion from the driving member to the driven member, i. e., fan pulley. The belts used for this purpose are known as fan belts and not only wear out in use but frequently break. Hence, frequent replacements are necessary.

It is the practice of the manufacturers of fan belts to designate the different sizes of belts by factory numbers. Information as to the sizes of the belts may or may not be furnished by the belt maker, since the fitting of belts on cars, trucks, tractors, etc. is supposed to be done with the aid of a catalog furnished by the belt maker.

It is not always possible, however, to identify models of cars, trucks, etc. from catalog specifications. Occasionally, such vehicles have been remodeled in such a way that they require a size of belt different from that which they used originally. Also, it is not possible for any belt maker to list all models of cars, trucks, etc. which are in use.

Therefore, it is often necessary for the dealer or service man to determine for himself what factory number of belt may be used. This is made more difficult by the fact that the size alone will not give him all the information he needs, because he must know the factory number of the belt required. Even after he determines the size of the belt he needs he may not be able to find out the factory number of the belt that corresponds thereto.

Furthermore, in the fitting of V-shaped fan belts the length of the belt that will work on the vehicle depends to some extent upon the width of the belt used. A wide belt that stands up high in the pulleys must be longer than a narrower belt that will sink deeper in the channel, so that in many cases any one of two or more factory numbers could be used. Very few dealers carry all the belt sizes made by belt manufacturers, and it is often desirable to be able to substitute a wider or a narrower belt which the dealer may have in stock in place of the factory number specified in the belt maker's catalog.

At the present time when a belt is to be replaced, the service man is unable to accurately and quickly determine what size belt is needed. To determine the size of the belt he employs the "hit and miss" method, i. e., he tries a number of belts until he finally finds one which will serve his purpose. Such a procedure is not only tedious but very often results in soiling the belts which had been tried but found not to fit and rendering them non-salable.

I have found that I can accurately and quickly determine the dimension of a belt to be used for driving an automobile fan or any other systems utilizing belts by using a material of such length as will enable the ends thereof to overlap when trained over a plurality of channeled or grooved pulleys and having a cross-section that will enable it to seat itself in the pulleys in the position to be occupied by the belt. By providing the device with certain indicia, as hereinafter more fully explained, the size and particular type of belt required becomes at once apparent.

It is therefore an object of this invention to provide a belt fitter which will accurately and quickly determine the size of the belt required.

A specific object of this invention is to provide a belt fitter comprising a material of such length as will enable the ends thereof to overlap when trained over channeled or grooved pulleys, said material having a cross-section whereby it will occupy substantially the same position in the pulley groove or channel as the belt, and indicia thereon adapted to cooperate with one end thereof to indicate the size and dimension of the belt required.

Other objects will appear from the following description, appended claim and accompanying drawing forming a part of this specification and in which:

Figure 1 illustrates one form of a belt fitter constituting this invention and the manner in which it is to be used.

Figure 2 illustrates a cross-section of one form of belt fitter.

Figure 3 illustrates a cross-section of another modification of belt fitter.

The present invention contemplates a device which is capable of quickly and accurately determining the size of the belt. According to this invention, the belt fitter is made of any suitable material or combination thereof and of such a length that it can be trained over the pulleys over which the belt itself is to be positioned and the ends thereof overlapped. Suitable markings, designating the size of the belts, are provided at any convenient place on the fitter, so that, when the ends of the belt are in overlapping relation, one end thereof will cooperate with said markings and thus indicate the size of the belt needed. The cross-section of the fitter may be of any suitable shape, such as round, square, rectangular, etc. Preferably, I make the cross-section of the belt of a shape corresponding to the cross-section of the pulley grooves. If desired, the fitter may be constructed so that it has a neutral axis at the top, bottom or at any point therebetween and various other parts contract and stretch. The fitter may also be solid or hollow as desired.

In order to more clearly explain the invention, several forms of belt fitter will be described.

Referring to the drawing wherein like reference numerals designate like parts, the reference numeral 1 designates one modification of a belt fitter in position around a plurality of pulleys 2 and 3 having V-shaped grooves and designating the size of the belt necessary for said pulleys. As previously explained, the belt fitter may be of any length, provided the length is sufficient so that, when used, the ends 4 and 5 thereof will overlap on the body portion. On any convenient surface, such as on the top, bottom, side or combination thereof and preferably adjacent the end 5, the belt fitter is provided with suitable markings 6 which may be figures, letters or symbols indicating either the dimension of the belt directly or the factory identification of the belt required. The markings 6 may be embossed, printed or applied in any other suitable well known manner.

Figure 2 illustrates a cross-section of a V-shaped belt fitter. This fitter comprises a core 7 formed of any suitable material, such as cord, cork, rubber, rope, etc. and enveloped by a rubberized fabric 8, the latter being vulcanized in position in a mold of suitable shape. The fabric 8 may be wound around the core one or more times and in the latter case it appears as a built-up laminated material.

Figure 3 designates another form of V-shaped belt fitter. The fitter therein illustrated consists of a plurality of rubberized fabric plies 9. In the manufacture of this type of fitter a plurality of rubberized fabric plies 9 are assembled and then vulcanized in a mold having the desired configuration. If desired, the fitter may be constructed with a neutral axis 10 at any suitable point, such as, for example, midway between the top and bottom thereof. In such a construction the upper plies may be capable of circumferential extension and the lower plies capable of contraction when used.

The belt fitters are supplied to the trade in sets of two or more, each member of the set slightly differing in width or angle or both from the other members in order to be applicable to the pulleys of automobiles produced by the different manufacturers. In operation, the belt fitter chosen as giving the best results from the standpoint of width and angle is then placed over all the pulleys over which the belt itself is to be trained. The ends 4 and 5 of the fitter are then made to overlap and assume the position illustrated in Figure 1. The end 4 will then be adjacent or opposite a mark (380 in Figure 1) which designates the particular size of the belt required. The service man then selects the proper belt and fits it in position.

From the above it is apparent that I have devised a simple, economical and easily manipulated device for determining the size of the belt needed. Due to the construction of the fitter it serves to directly and accurately indicate the size of the belt required. It eliminates the "hit and miss" haphazard, inaccurate method previously used and prevents the soiling of the belts. As hereinbefore set forth, the belt fitter may be made to show the factory numbers of the belts, instead of or in addition to the sizes, thus making it unnecessary to refer to any size list and enabling the dealer to find instantly the factory number of the belt that will answer. It enables him to serve cars, trucks, etc. which are not shown in the catalog or which cannot be identified in the catalog. By the use of wider or narrower belt fitters of my invention the dealer can determine what wider or narrower belts may be used on any particular applications, and thus substitute a different belt number that he may have in stock for the one specified in the catalog which he may not have on hand.

Since it is obvious that various modifications may be made in the specific details hereinabove set forth, the invention is not restricted thereto except as set forth in the appended claim.

I claim:

A belt fitter for automobile fan belts or the like comprising a material having a V-shaped cross-section and of such a length as will enable the ends thereof to overlap when trained over a plurality of pulleys of the various makes of automobiles, said pulleys having V-shaped grooves, the portion adjacent one end of said material having markings spaced in accordance with standard automobile belt sizes to cooperate with the opposite end to indicate the size of belt required.

In testimony whereof, I have affixed my signature to this specification.

MATTHEW E. HILL.